United States Patent [19]

Morel et al.

[11] Patent Number: 4,711,975
[45] Date of Patent: Dec. 8, 1987

[54] PROTECTIVE SLEEVE AND A METHOD FOR PROTECTING CABLE SPLICES

[75] Inventors: Jacques Morel, Fontaine Les Ribouts; Didier Morel, Favieres, both of France

[73] Assignee: Etablissements Morel - Ateliers Electromecaniques de Favieres, Chateauneuf En Thymerais, France

[21] Appl. No.: 863,828

[22] Filed: May 12, 1986

[30] Foreign Application Priority Data

May 31, 1985 [FR] France .................. 85 08219

[51] Int. Cl.$^4$ .......................... H02G 15/113
[52] U.S. Cl. ...................... 174/92; 29/868; 156/49; 174/77 R; 174/93
[58] Field of Search .............. 174/92, 93, 77 R; 156/49; 29/868

[56] References Cited

U.S. PATENT DOCUMENTS

| 3,701,835 | 10/1972 | Eisele et al. | 174/92 X |
| 4,236,047 | 11/1980 | Haeder | 174/93 X |
| 4,387,268 | 6/1983 | Morel et al. | 174/92 |
| 4,492,816 | 1/1985 | Morel et al. | 174/92 |

FOREIGN PATENT DOCUMENTS

| 0098765 | 1/1984 | European Pat. Off. . | |
| 168991 | 7/1905 | Fed. Rep. of Germany . | |
| 2406003 | 8/1974 | Fed. Rep. of Germany | 174/93 |
| 1495504 | 9/1967 | France | 174/92 |
| WO81/01487 | 5/1981 | PCT Int'l Appl. . | |

Primary Examiner—Morris H. Nimmo
Attorney, Agent, or Firm—Young & Thompson

[57] ABSTRACT

A sleeve for protecting cable splices, in particular for telephone cables, comprises two half-shells (3, 4) so designed as to be assembled together along their longitudinal edges (3a, 4a) around the cable splice (2). The opposite ends of the sleeve have jaws (5, 6, 7, 8) for radial clamping and axial retention of the two cable ends (1a, 1b) and means are provided for forming a fluid-tight seal between the two half-shells (3, 4) and between the cable and the jaws. The half-shell (4) comprises two end elements (9, 10) which are intended to be fitted over the clamping jaws (5, 6, 7, 8) and a central element (11) which is placed between the two end elements and covers their adjacent edges (9a, 10a).

15 Claims, 10 Drawing Figures

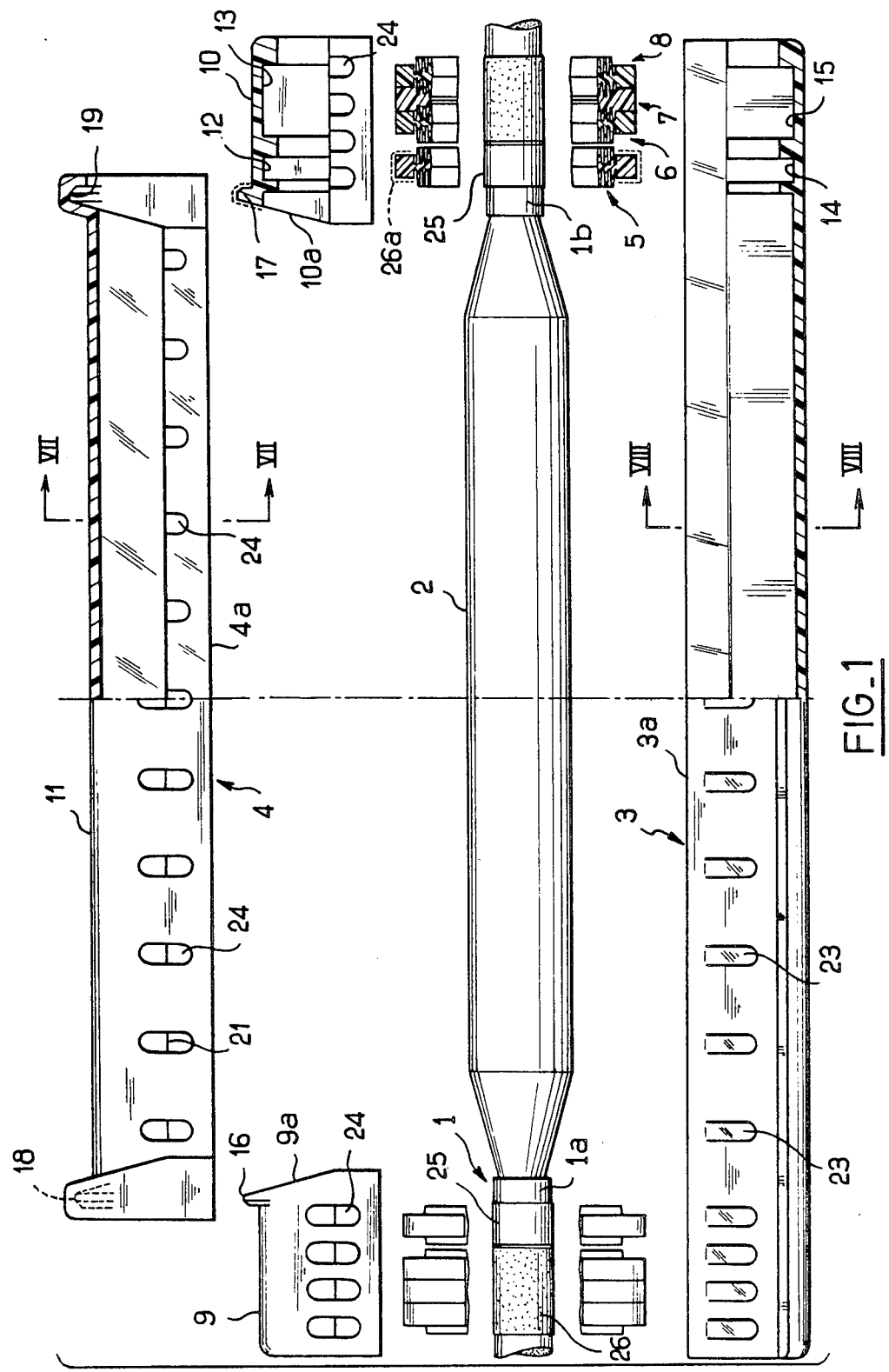
FIG_1

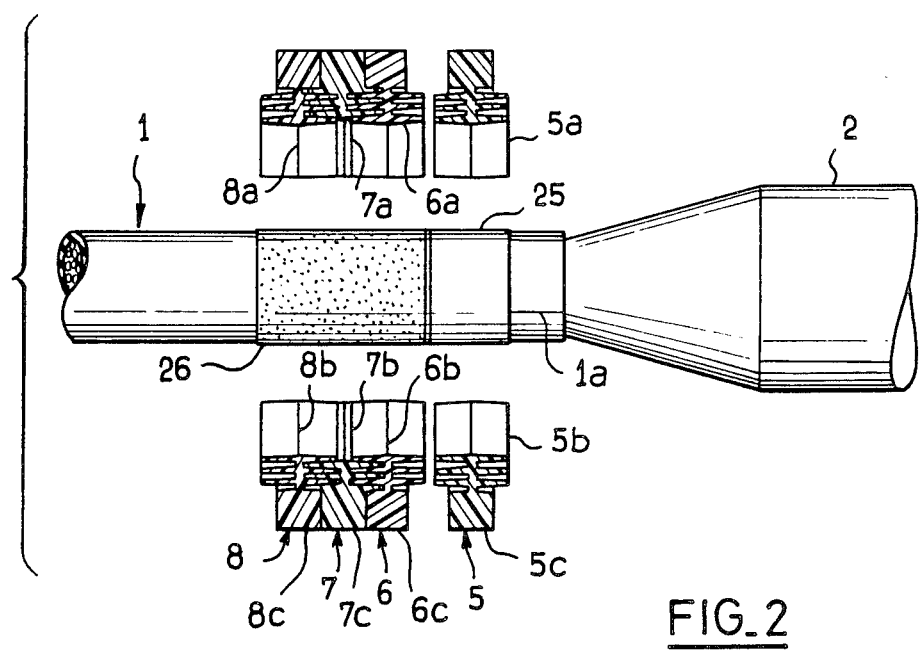
FIG_2
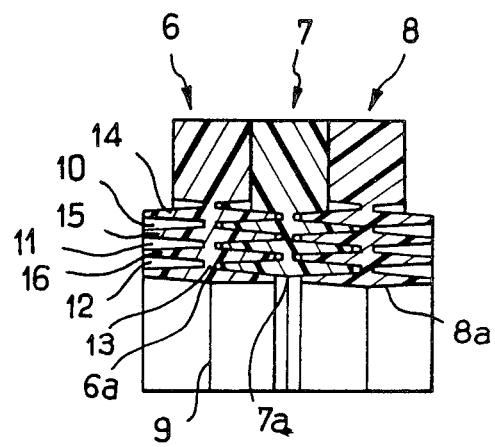
FIG_3

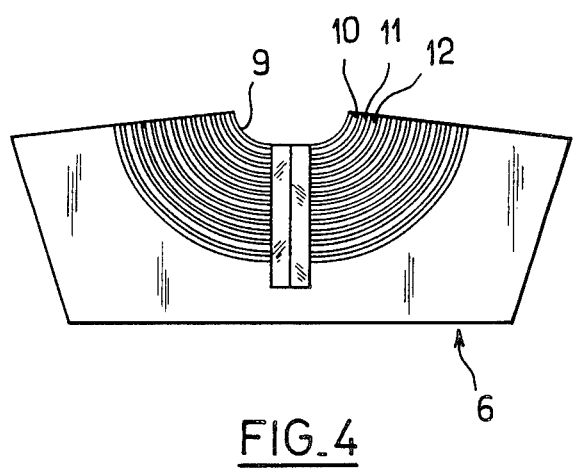
FIG_4
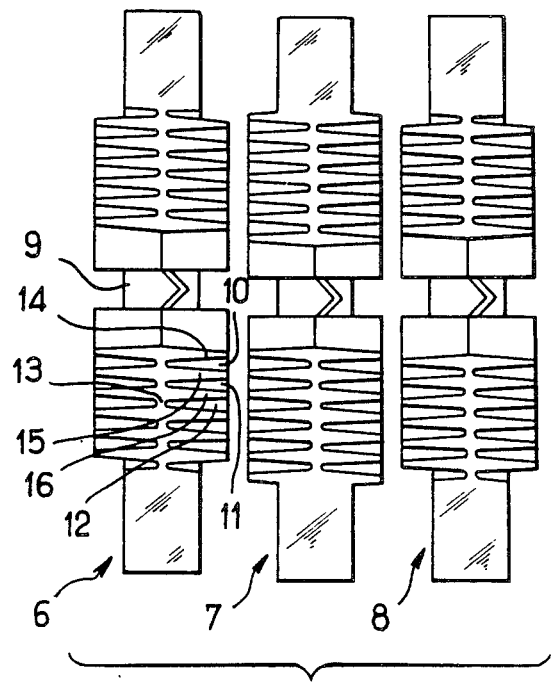
FIG_5

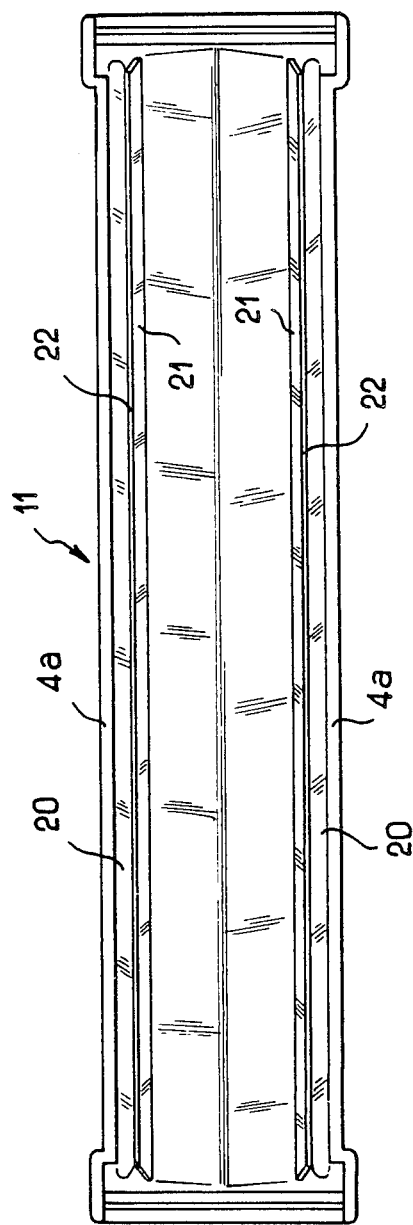
FIG._6
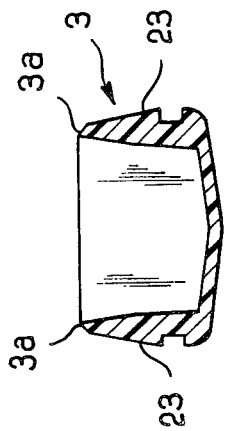
FIG._8
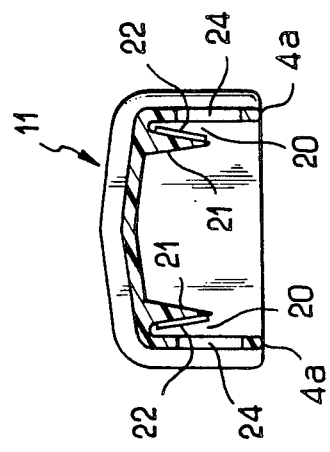
FIG._7

PROTECTIVE SLEEVE AND A METHOD FOR PROTECTING CABLE SPLICES

BACKGROUND OF THE INVENTION

1. Field of the Invention

The present invention relates to a sleeve for protecting the splices of cables and especially telephone cables.

The invention is also directed to a method for protecting the splice of a cable and especially a telephone cable by means of the protective sleeve aforesaid.

2. Description of the Prior Art

Sleeves of known types for protecting telephone cable splices are disclosed in particular in French patent No. 2,469,782, in French Certificates of Addition Nos. 2,479,545, 2,492,151, 2,529,707 and 2,541,528. These protective sleeves comprise two half-shells which are intended to be placed around the cable and assembled together along their longitudinal edges, each half-shell being formed in one piece.

The opposite ends of the sleeve have jaws for radially clamping and axially retaining the two cable ends which have been joined together by splicing. Means are provided in addition for forming a tight seal between the two half-shells and between the cable ends and the jaws.

The sleeves described in the French patent, Certificates of Addition and patent Applications cited above provide the cable splices with effective protection against mechanical shocks and moisture. However, sleeves of this type are subject to a disadvantage as will now be explained.

After an initial operation which consists in forming a splice between the two cable ends, the two connected ends of the cable are then placed in the first half-shell, whereupon the second half-shell is fixed on the first half-shell. To this end, it is essential to form the splice by maintaining the two cable ends in a temporary support which is separate from the sleeve and serves to fix the two cable ends in spaced relation at a predetermined distance from each other.

This operation is both time-consuming and tedious since it is often performed under conditions of limited comfort. Furthermore, this operation does not permit very accurate positioning of the two cable ends with respect to each other.

Moreover, it is then necessary to place sealing means such as jaws and sealing strips on the two cable ends which have previously been joined together.

A further drawback lies in the fact that the cable is difficult to handle since the cable ends have previously been joined together, with the result that positioning of the cable within the protective sleeve is also a difficult operation. In consequence, there inevitably remains a potential danger of faulty positioning of the cable which may lead to deficiencies in fluid-tightness.

The aim of the present invention is to overcome the disadvantages mentioned in the foregoing by providing a protective sleeve which permits very easy positioning of the cable ends within said sleeve while avoiding any risk of defective sealing as mentioned in connection with known designs.

SUMMARY OF THE INVENTION

The sleeve contemplated by the invention for protecting cable splices in particular for telephone cables comprises at least two half-shells to be assembled together along their longitudinal edges around the cable splice, the opposite ends of the sleeve being provided with jaws for radially clamping and axially retaining the two cable ends which are connected by means of the splice. Means are provided for forming a tight seal between the two half-shells and between the cable ends and the jaws, one of the half-shells being formed in one piece.

The sleeve in accordance with the invention is distinguished by the fact that the second half-shell is provided with two end elements for covering the clamping jaws and a central element which is intended to be placed between said two end elements and covers the adjacent edges of these latter.

According to another aspect of the invention, the method for protecting a cable splice in particular for a telephone cable by means of the sleeve in accordance with the invention comprises the following steps:

a first series of jaw elements is placed at the opposite ends of the first half-shell;

the two cable ends which have not yet been joined together are placed on the corresponding jaw elements located at each end of the half-shell;

a second series of jaw elements is placed on the two cable ends opposite to the first series of jaw elements;

said second series of jaw elements is covered by the two end elements of the second half-shell and these latter are fixed on the first half-shell after having adjusted the axial positions of the two cable ends if necessary;

a splice is formed between the two cable ends;

the central element of the second half-shell is placed between the two end elements aforesaid and on the first half-shell and these components are then fastened together.

The invention thus makes it possible to form the splice with great ease and accuracy by using the sleeve itself as a support.

Moreover, since the cable-sealing means have already been placed in position before forming the splice, there is no further likelihood of deficiencies in fluid-tightness of the cable as a result of difficulties involved in handling a cable whose ends have already been joined together as was the case in the prior art. In addition, it is possible in a subsequent operation to disassemble the sleeve by removing the central element 11 in order to inspect the splice without destroying the seal formed between the jaws and the cable.

Preferably, the jaws employed for radially clamping and axially retaining the two cable ends each comprise two jaw elements. Each jaw element is provided with an arcuate recess having a radius corresponding substantially to that of the cable. The opposite lateral faces of each element are each provided with a series of arcuate grooves which are concentric with the recess, the bottom portions of opposite grooves being joined to each other by a thin wall which can be cut. By cutting the jaw elements along one of the arcuate grooves, it is possible to adjust the radius of the recess to that of the cable employed.

In an advantageous embodiment of the invention, fins having a profile which is complementary to that of the grooves are defined between said grooves.

The result thereby achieved is that it is possible to place at least three juxtaposed jaws at each end of the sleeve, the fins of the central jaw being engaged in the complementary grooves of the other two jaws.

These interengaged jaws ensure excellent axial retention of the cable within the sleeve.

In a preferred embodiment of the invention, each end of the jaw further comprises a fourth jaw spaced at a distance from the other three jaws and located nearer the splice than these other three jaws.

Preferably, a band of sealing compound is placed between the cable and the recesses of the two jaw elements which constitute said fourth jaw.

In another preferred embodiment, an adhesive band provided with small surface excrescences is placed between the cable and the recesses of the jaw elements which constitute the three juxtaposed jaws, the small surface excrescences being adjacent to said recesses.

The fourth jaw which is free with respect to the others is compressible in the radial direction at the time of assembly of the sleeve by virtue of the arcuate grooves, thus ensuring a high standard of fluid-tightness with respect to the cables in conjunction with the sealing band.

Moreover, the adhesive band which is provided with small surface excrescences placed between the cable and the other three jaws serves to ensure highly effective axial retention of the cable by the sleeve.

BRIEF DESCRIPTION OF THE DRAWINGS

These and other features of the invention will be more apparent to those skilled in the art upon consideration of the following description and accompanying drawings, wherein:

FIG. 1 is an exploded view of the different components of the protective sleeve in accordance with the invention, the left-hand portion being represented in plan and the right-hand portion being a longitudinal sectional view of the different components;

FIG. 2 is a view to a larger scale illustrating part of the cable, placed between the jaw elements which are shown in longitudinal cross-section;

FIG. 3 is a longitudinal sectional view to a larger scale showing three jaw elements in interengaged relation;

FIG. 4 is a plan view of one jaw element;

FIG. 5 is a top view of three jaw elements prior to interengagement of these latter;

FIG. 6 is a plan view showing the interior of the central element of the second half-shell;

FIG. 7 is a sectional view taken along the plane VII—VII of the central element of the second half-shell shown in FIG. 1;

FIG. 8 is a sectional view taken along the plane VIII—VIII of the first half-shell shown in FIG. 1;

DESCRIPTION OF THE PREFERRED EMBODIMENTS

Figure 9:
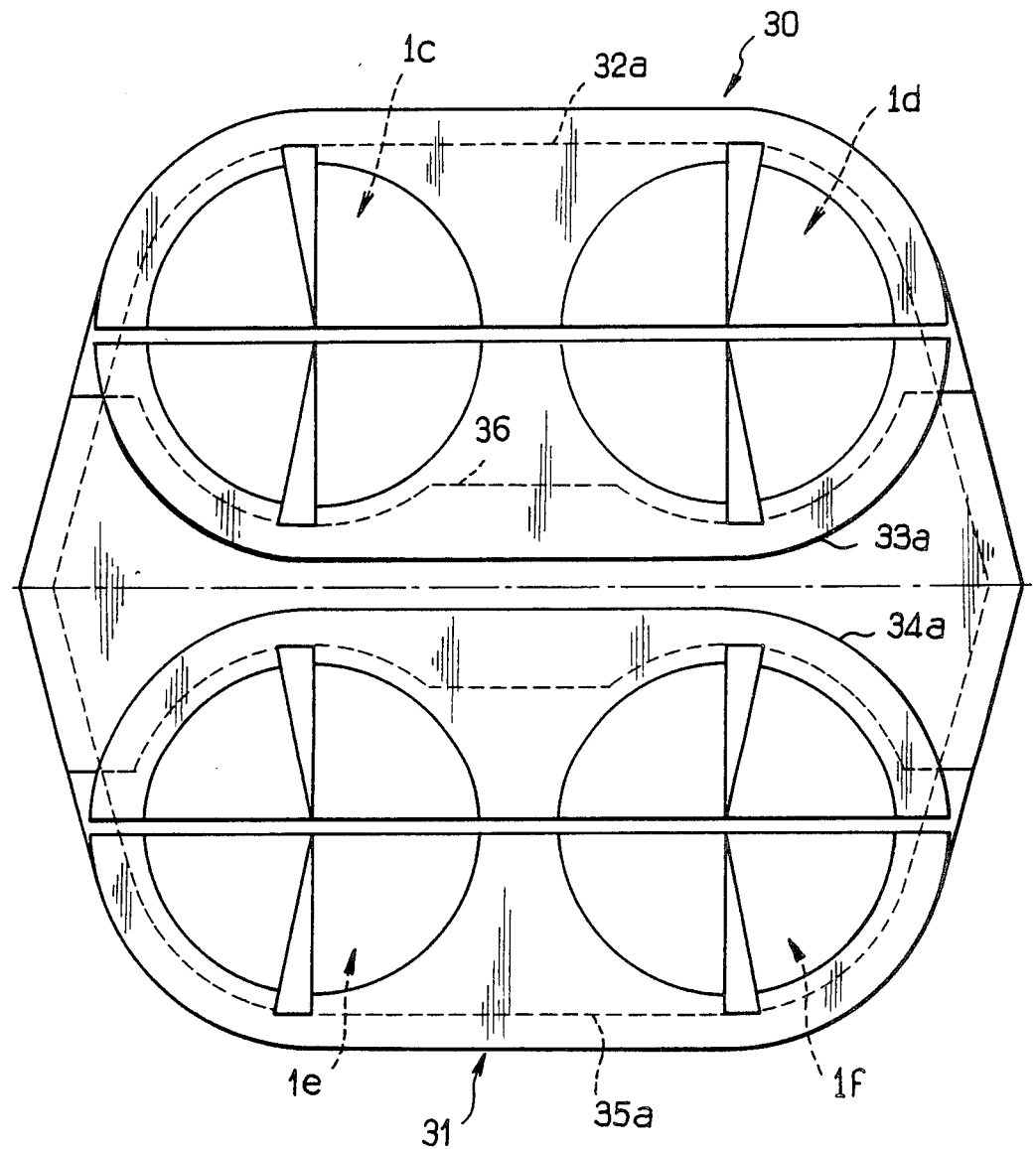
FIG. 9 is an end view of a sleeve adapted to protect four cables.

In the embodiment of FIG. 1, the sleeve made of plastic material for protecting the splice 2 of the telephone cable 1 comprises two half-shells 3, 4 which are intended to be assembled together along their longitudinal edges 3a, 4a around the splice 2 of the cable 1. The opposite ends of the sleeve each comprise jaws 5, 6, 7, 8 for radially clamping and axially retaining the two cable ends 1a, 1b which are joined together by means of the splice 2. Means which will hereinafter be described in detail are provided for forming a fluid-tight seal between the two half-shells 3, 4 and between the cable ends 1a, 1b and the jaws 5, 6, 7, 8.

The first half-shell 3 is of one-piece construction.

The second half-shell 4 comprises two end elements 9, 10 which are intended to cover the clamping jaws 5, 6, 7, 8 and a central element 11 which is intended to be placed between these two end elements 9, 10 and covers the adjacent edges 9a, 10a of these latter.

The end elements 9, 10 of the second half-shell 4 and the ends of the first half-shell 3 have grooves 12, 13; 14, 15 for axial retention of the jaws 5, 6, 7, 8 which are perpendicular to the axes of said half-shells.

Furthermore, that edge 9a, 10a of the two end elements 9, 10 which is covered by to the central element 11 is provided with a projecting rib 16, 17 whilst the adjacent edges of the central element 11 have a complementary groove 18, 19 which is intended to receive a sealing strip consisting of a sealing compound, for example, in order to form a tight joint between the adjacent edges of the central element 11 and the end elements 9, 10.

The central element 11 and the end elements 9, 10 of the half-shell 4 are provided internally and along their two longitudinal edges 4a (as shown in FIGS. 6 and 7) with two V-section grooves 20 which are intended to receive by interengagement the longitudinal edges 3a of complementary cross-section of the half-shell 3 (as shown in FIG. 8).

In the example illustrated in FIGS. 6 to 8, a fluid-tight seal between the longitudinal edges of the half-shell 3, of the central element 11 and of the end elements 9, 10 is formed by placing a strip 22 of sealing compound within the grooves 20 against the lateral face of the ribs 21 which define said grooves 20.

It is further apparent, especially from FIGS. 7 and 8, that the central element 11 and the end elements 9, 10 of the half-shell 4 are fixed on the half-shell 3 by means of snap-fastening noses 23 which are formed on the lateral walls of the half-shell 3 and are capable of engaging within complementary openings 24 formed in the flexible lateral walls of the end elements 9, 10 and of the central element 11 constituting the half-shell 4.

It is apparent in particular from FIGS. 2, 3, 4 and 5 that the clamping jaws 5, 6, 7, 8 each comprise two jaw elements 5a, 5b; 6a, 6b; 7a, 7b; 8a, 8b. Each jaw element has a substantially arcuate recess such as the recess 9 (shown in FIG. 4). In FIGS. 4 and 5, it can be seen in particular that the opposite lateral faces of each jaw element each have a series of arcuate grooves 10, 11, 12, ... which are concentric with the recess 9. The bottom portions of opposite grooves 10, 11, 12, ... are joined to each other by a thin wall 13 (as shown in FIG. 5) which can be cut.

Thus, by cutting said thin wall 13 by means of a suitable cutting tool along one of the grooves such as those designated by the references 10, 11, 12, ... , it is possible to adapt the radius of the recess thus formed in the jaw elements to the radius of the cable 1 in order to ensure that said recess conforms perfectly to the profile of the cable 1.

Jaws of this type are described in the French patents and Certificates of Addition filed by the present Applicant and cited at the beginning of this specification.

In the case of the embodiment under consideration (as shown in FIGS. 3 and 5), the grooves such as those designated by the references 10, 11, 12 define between them fins 14, 15, 16 having a profile which is complementary to that of the grooves 10, 11, 12 . . . .

In addition, as shown in FIGS. 1 and 2, each end of the sleeve comprises a series of three juxtaposed jaws 6, 7, 8, the fins such as 14, 15, 16 of the central jaw 7 being engaged is the complementary grooves of the; other two jaws 6, 8.

Moreover, each jaw element has a non-grooved portion such as that designated by the references 6c, 7c, 8c of smaller thickness than the grooved portion. The thickness of said non-grooved portion is such that, when the fins of the central jaw 7 are fully engaged within the complementary grooves of the other two jaws 6, 8, the non-grooved portions 6c, 7c, 8c of the three jaws 6, 7, 8 are applied laterally against each other.

Moreover, the total thickness of the three non-grooved portions of the jaws 6, 7, 8 corresponds to the width of the grooves 13, 15 formed in the end elements 9, 10 and in the half-shell 3. The result thereby achieved is that, in the assembled position, the jaws 6, 7, 8 are perfectly keyed in the axial direction and are not liable to bend when a pull is exerted on the cable.

It is further apparent from FIGS. 1 and 2 that each end of the sleeve comprises in addition a fourth jaw 5 which is spaced at a distance from the other two jaws 6, 7, 8 and located nearer the splice 2 than these other three jaws.

In the position of assembly of the sleeve, the two elements constituting the jaw 5 are applied by means of their recesses on a band 25 of sealing compound which is wound around the corresponding end 1a, 1b of the cable.

In order to achieve total fluid-tightness, a band 26a of sealing compound shown in dashed outline in FIG. 1 is placed on the jaw 5 in order to establish a fluid-tight seal between this latter and the corresponding grooves 12, 14 of the end elements 9, 10 and of the half-shell 3.

In addition, an adhesive band 26 provided with small surface excrescences is placed between the cable end 1a, 1b and the recesses of the jaw elements constituting the three juxtaposed jaws 6, 7, 8, the surface excrescences being adjacent to said recesses.

To this end, said adhesive band 26 can be provided on the face adjacent to the jaw recesses with grains having a sufficient degree of hardness such as particles of silica so as to ensure that these latter are capable of penetrating to a slight extent into the plastic material of the jaws 6, 7, 8 at the time of assembly of the sleeve.

The method for protecting the splice 2 of the cable 1 by means of the sleeve in accordance with the invention will now be described.

In a first step, a first series of jaw elements 5a, 6a, 7a, 8a is placed at the opposite ends of the first half-shell 3.

In a second step, the two cable ends 1a, 1b which have not yet been joined together but already carry the bands 25 of sealing. compound and adhesive bands 26 having surface excrescences are placed on the corresponding jaw elements 5a, 6a, 7a, 8a which are placed at each end of the half-shell. At this stage, the positions of the cable ends 1a, 1b are adjusted axially.

In a third step, a second series of jaw elements 5b, 6b, 7b, 8b is placed on the two cable ends 1a, 1b opposite to the first series of jaw elements 5a, 6a, 7a, 8a.

In a fourth step, the second series of jaw elements 5b, 6b, 7b, 8b is covered by the two end elements 9, 10 of the second half-shell and these latter are fixed on the first half-shell 3. To this end, it is only necessary to exert a thrust on the end elements 9, 10 in order to ensure that the snap-fastening noses 23 of the half-shell 3 engage in the lateral openings 24 of the end elements 9, 10.

On completion of the fourth step, the two cable ends 1a, 1b are securely attached to the half-shell 3 and to the end elements 9, 10 and a tight seal is formed between these cable ends and the jaws 5, 6, 7, 8.

It is then possible in a fifth step to form the splice 2 between the two cable ends 1a, 1b under conditions of great ease and convenience.

In a final step, the central element 11 of the second half-shell is placed between the two end elements 9, 10 and on the first half-shell 3 and these components are fastened together as before by snap-action engagement of the noses 23 of the half-shell 3 within the openings 24 of the central element 11.

Before placing the two end elements 9, 10 and the central element 11 of the second half-shell on the first half-shell 3, a band of sealing material is placed on the ribs 16, 17 of the end elements 9, 10 in order to form a fluid-tight seal with the grooves 18, 19 formed on the adjacent edges of the central element 11.

A very high standard of fluid-tightness is thus obtained between the cable ends 1a, 1b and the jaws 5.

By reason of the fact that each jaw 5 is free with respect to the other jaws 6, 7, 8, said jaw 5 is compressible radially by virtue of the presence of the arcuate grooves. This radial compressibility is conducive to the achievement of excellent fluid-tightness. Furthermore, fluid-tightness is even further enhanced by the presence of the band 25 of sealing compound which serves to make up for the fact that the cable 1 is not perfectly circular but is ovalized to a more or less marked degree.

On the other hand, the jaw 5 cannot alone produce a sufficient axial retaining action on the cable 1. This axial retaining action is performed by the three jaws 6, 7, 8 which are laterally engaged within each other by means of their complementary grooves and circular fins. By virtue of this interengagement, flexural deformation of the three jaws 6, 7, 8 in a plane perpendicular to the cable is not liable to occur.

Moreover, at the time of assembly of the end elements 9, 10 under pressure, the elements constituting the jaws 6, 7, 8 are clamped against the cable ends 1a, 1b, with the result that the small surface excrescences of the adhesive band 26 penetrate to a slight extent into the plastic material of said jaws, thus preventing any possibility of axial slippage of the cable 1 with respect to the jaws and to the sleeve as a whole.

Figure 10:
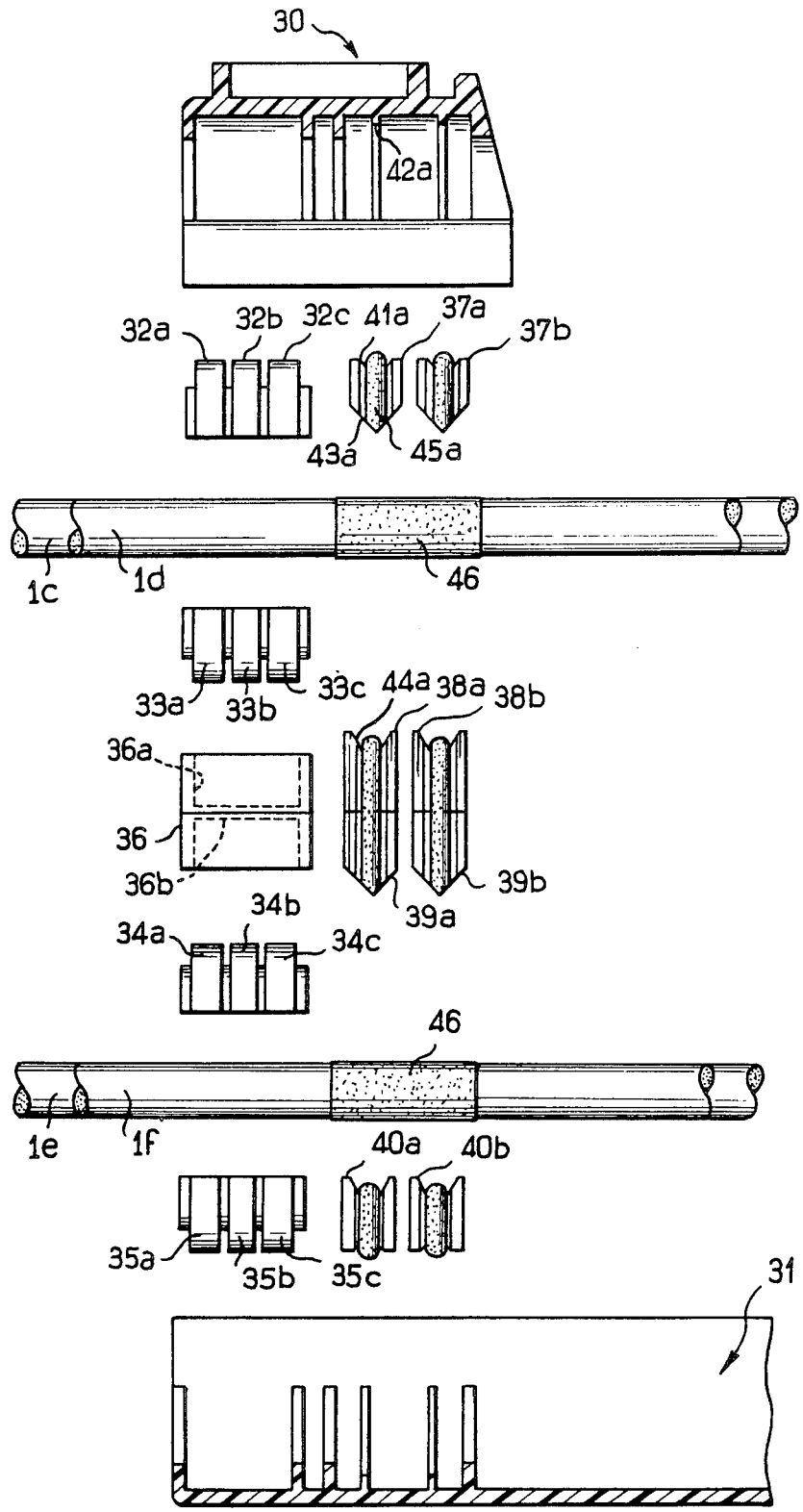
FIG. 10 is a fragmentary longitudinal sectional view of the sleeve of FIG. 9.

In the embodiment of FIGS. 9 and 10, there is shown a sleeve which is capable of receiving four cables 1c, 1d, 1e, 1f.

As shown in FIG. 10, this sleeve comprises two end elements 30 which are similar to the elements 9, 10 but so arranged as to receive the two upper cables 1c, 1d placed side by side, and an intermediate element (not shown in the drawings) which is similar to the element 11 but also adapted to receive the two cables 1c, 1d. The end elements 30 and the intermediate element are intended to be fixed on a lower half-shell 31 which is similar to the half-shell 3 but capable of receiving the two lower cables 1e, 1f.

Between each end element 30 and the lower half-shell 31 are placed jaw elements 32a, 32b, 32c; 33a, 33b, 33c; 34a, 34b, 34c; 35a, 35b, 35c. Said jaw elements are intended to be assembled together in pairs in order to form cable-clamping jaws which are similar to the jaws 6, 7, 8 except for the fact that each jaw element has two semi-circular recesses located in side-by-side relation for receiving two cables 1c, 1d or 1e, 1f.

The jaw elements 32a, 32b, 32c and 33a, 33b, 33c are intended to clamp the upper cables 1c, 1d whilst the jaw elements 34a, 34b, 34c and 35a, 35b, 35c are intended to clamp the lower cables 1e, 1f.

Between the jaw elements 33a, 33b, 33c and the jaw elements 34a, 34b, 34c is placed an intermediate element 36 having two opposite grooves 36a, 36b adapted to receive the end of the jaw elements aforesaid, namely the end opposite to the cables 1c, 1d; 1e, 1f.

Behind the jaw elements aforesaid are placed jaw elements 37a, 37b; 38a, 38b; 39a, 39b; 40a, 40b having a structure which is different from those constituting the jaw 5 shown in FIG. 1.

The jaw elements 37a, 37b and 38a, 38b are intended to clamp the cables 1c, 1d whilst the jaw elements 39a, 39b and 40a, 40b are intended to clamp the cables 1e, 1f.

Furthermore, the jaw elements 38a, 38b and 39a, 39b located between the pairs of cables 1c, 1d and 1e, 1f are of single-piece construction and are consequently provided with four opposite recesses per pair in order to receive the four cables.

That end of the jaw elements 37a, 37b; 40a, 40b which is adjacent to the end element 30 of the sleeve or to the half-shell 31 is provided with a V-section recess such as 41a which is intended to fit over a rib such as 42a formed on the internal face of the jaw element 30 or of the half-shell 31.

In addition, the jaw elements 37a, 37b are each provided on the end adjacent to the cables 1c, 1d with a V-section projecting portion such as the portion 43a which is intended to penetrate into a groove of complementary section such as the groove 44a formed on the end of each jaw element 38a, 38b.

Similarly, the jaw elements 39a, 39b are provided with V-section projecting portions which are intended to engage in complementary grooves formed in the adjacent ends of the jaw elements 40a, 40b.

It is also apparent from FIG. 10 that the groove such as 41a of each jaw element such as 37a is fitted with a strip of sealing compound such as the strip 45a which surrounds said element and makes it possible to ensure that, at the time of assembly of the sleeve and clamping of the jaw elements against the cables 1c, 1d, 1e, 1f, a tight seal is formed between the jaw elements, the cables, the end element 30 and the half-shell 31. The degree of fluid-tightness thus attained is enhanced by the presence of a band 46 of sealing compound wound around cables 1c, 1d, 1e, 1f, the jaw elements 37a to 40b being intended to be applied against said sealing band.

It will be readily apparent that, in the case of the embodiment shown in FIG. 1 in which the sleeve is adapted to receive only one cable, the jaw elements constituting the jaw 5 could be replaced by jaw elements similar to the elements such as those designated by the references 37a to 40b.

It should be understood that the invention is not limited to the examples described in the foregoing and that any number of modifications may accordingly be contemplated without thereby departing either from the scope or the spirit of the invention.

Moreover, the adhesive band 26 or 46 could be replaced by a band of plastic material provided with studs on one or both faces of the band, said studs being molded with the band material and capable of penetrating into the sheath of the cable 1 and/or into the plastic material of the jaws. To this end, it is only necessary to ensure that the plastic material of said band has a higher degree of hardness than the cable sheath and the jaws.

What is claimed is:

1. A sleeve for protecting cable splices in particular for telephone cables, comprising at least two half-shells (3, 4) to be assembled together along their longitudinal edges (3a, 4a) around at least one cable splice (2), opposite ends of the sleeve being provided with separate jaws (5, 6, 7, 8) held together by the half-shells for radially clamping and axially retaining two cable ends (1a, 1b) which are to be connected by means of the splice (2), means for forming a tight seal between the at least two half-shells (3, 4), between the cable ends (1a, 1b) and the jaws and between the at least two half-shells and the jaws, one of the half-shells (3) being formed in one piece, the second half-shell (4) having two end elements (9, 10) for covering the clamping jaws (5, 6, 7, 8), thereby to realize a tight seal between the cable ends (1a, 1b) and the jaws (5, 6, 7, 8) and between the jaws, the respective end elements (9, 10) and the lower half-shell, and a central element (11) separate from said end elements (9, 10), which is adapted to be placed between the at least two end elements and covers the edges (9a, 10 a) of said end elements which are adjacent to it, thereby to realize a tight seal between the half shells (3, 4).

2. A sleeve according to claim 1, wherein the end elements (9, 10) of the second half-shell and the ends of the first half-shell (3) have grooves (12, 13; 14, 15) for retaining the jaws (5, 6, 7, 8).

3. A sleeve according to claim 1, wherein the edges (9a, 10a) of the two end elements (9, 10) adjacent to the central element (11) have a projecting rib (16, 17), the adjacent edges of the central element (11) having a complementary groove (18, 19) for receiving a sealing strip.

4. A sleeve according to claim 1, the clamping jaws (5, 6, 7, 8) being each constituted by two jaw elements (5a, 5b, . . .8a, 8b) each having an arcuate recess (9), the opposite lateral faces of each element having each a series of arcuate grooves (10, 11, 12) which are concentric with the recess (9), the bottom portions of opposite grooves being joined to each other by a thin wall (13) which can be readily cut, and fins (14, 15, 16) which have a profile which is complemennntary to that of the grooves (10, 11, 12) and which are disposed between said grooves.

5. A sleeve according to claim 4, wherein each end of the sleeve comprises at least three jaws (6, 7, 8) which are juxtaposed, the fins (14, 15, 16) of the central jaw (7) being engaged in the complementary grooves (10, 11, 12) of the other two jaws.

6. A sleeve according to claim 5, wherein each jaw has a non-grooved portion (6c, 7c, 8c) of smaller thickness than the grooved portion, the thickness of said non-grooved portion being such that when the fins of the central jaw (7) are completely engaged within the complementary grooves of the other two jaws (6, 8), the non-grooved portions (6c, 7c, 8c) of the three jaws are applied laterally against each other.

7. A sleeve according to claim 5, wherein each end of the sleeve further comprises a fourth jaw (5) spaced at a distance from the other three jaws (6, 7, 8) for location nearer the splice (2) than the other three jaws.

8. A sleeve according to claim 7, and a band (25) of sealing compound for placement between the cable (1) and the recesses (9) of the of the two jaw elements (5a, 5b) which constitute the fourth jaw (5).

9. A sleeve according to claim 5, and an adhesive band (26) having small surface excrescences disposed between a cable (1) and the recesses (9) of the jaws which constitute the three juxtaposed jaw (6, 7, 8) which are adjacent to said recesses.

10. A sleeve according to claim 9, wherein the adhesive band (26) is covered with particles having a high degree of hardness on the face adjacent to the recesses aforesaid.

11. A sleeve according to claim 7, wherein the jaw elements (37a, . . . 40a) forming at least one pair, are each provided at one end with a V-section groove (41a) engaged over a rib (42a) formed on the internal face of the end element (30) and of the half-shell (31) and at the other end, for one jaw element (37a), with a projecting portion (43a) engaged in a V-section groove (44a) formed in the adjacent jaw element (40a) and wherein a strip (45a) of sealing material is fitted within the grooves (41a, 44a) in order to form a fluid-tight seal on the one hand between said jaw elements, said end element (30) and said half-shell (31) and on the other hand between said jaw elements and the cable (1c).

12. A sleeve according to claim 1, wherein said sleeve is adapted to receive at least two cables (1c, 1d; 1e, 1f) and wherein each jaw element is adapted to clamp two cables.

13. A method for protecting a cable splice in particular for a telephone cable by means of a sleeve comprising at least two half-shells (3, 4) to be assembled together along their longitudinal edges (3a, 4a) around at least one cable splice (2), opposite ends of the sleeve having separate jaws (5, 6, 7, 8) held together by the half-shells for radially clamping and axially retaining two cable ends (1a, 1b) which are connected by means of the splice (2), means being provided for forming a tight seal between the at least two half-shells (3, 4), between the cable ends (1a, 1b) and the jaws, and between the at least two half-shells and the jaws, one of the half-shells (3) being formed in one piece, wherein the second half-shell (4) is provided with two end elements (9, 10) for covering the clamping jaws (5, 6, 7, 8), thereby to realize a tight seal between the cable ends (1a, 1b) and the jaws (5, 6, 7, 8) and between the jaws, the respective end elements (9, 10) and the lower half-shell and a central element (11), separate from said end elements (9, 10), which is to be placed between the at least two end elements, thereby to realize tight seal between the half-shells (3, 4), wherein said method comprises the following steps:

placing a first series of jaw elements (5a, 6a, 7a, 8a) at the opposite ends of the first half-shell (3);

placing two cable ends (1a, 1b) which have not yet been joined together on the corresponding jaw elements located at each end of the half-shell (3);

placing a second series of jaw elements (5b, 6b, 7b, 8b) on the cable ends (1a, 1b) opposite to the first series of jaw elements;

covering said second series of jaw elements by the two end elements (9, 10) of the second half-shell and fixing said end elements on said first half-shell (3);

forming a splice (2) between the two cable ends;

placing the central element (11) of the second half-shell between the two end elements (9, 10) aforesaid and on the first half-shell (3), and then fastening together these components.

14. A method according to claim 13, comprising the step of fixing a band (25) of sealing compound and an adhesive band (26) provided with small surface excrescences on the cable ends (1a, 1b) before placing said cable ends on the jaws elements.

15. A method according to claim 13, comprising the step of placing bands of sealing material on the assembly edges of the two end elements (9, 10) before placing said two end elements and the central element (11) of the second half-shell on the first half-shell (3).

* * * * *